United States Patent [19]

Shiga et al.

[11] 4,042,352

[45] Aug. 16, 1977

[54] METHOD FOR THE REMOVAL OF THE DUSTS FROM COMBUSTION EXHAUST GASES

[75] Inventors: Shujiro Shiga, Chiba; Takeshi Katsumata, Ichihara; Yasushi Okamoto, Ichihara; Takashi Nakata, Ichihara, all of Japan

[73] Assignee: Sumitomo Chemical Company, Limited, Osaka, Japan

[21] Appl. No.: 679,447

[22] Filed: Apr. 22, 1976

[30] Foreign Application Priority Data

Apr. 22, 1975 Japan ................................. 50-49249

[51] Int. Cl.$^2$ ............................................. B01D 43/30
[52] U.S. Cl. ......................................... 55/98; 55/512
[58] Field of Search ................... 55/98, 474, 484, 512, 55/523, DIG. 16, 75; 252/449; 23/288 F, 288 FB

[56] References Cited

U.S. PATENT DOCUMENTS

| | | | |
|---|---|---|---|
| 2,698,305 | 12/1954 | Plank et al. | 252/449 |
| 2,963,519 | 12/1960 | Kasperik et al. | 55/75 |
| 3,252,271 | 5/1966 | Hatch et al. | 55/474 |
| 3,505,008 | 4/1970 | Frevel et al. | 55/98 |
| 3,888,972 | 6/1975 | Kiselev et al. | 252/449 |
| 3,935,299 | 1/1976 | Kiselev et al. | 252/449 |

*Primary Examiner*—Frank W. Lutter
*Assistant Examiner*—David L. Lacey
*Attorney, Agent, or Firm*—Birch, Stewart, Kolasch and Birch

[57] ABSTRACT

A method for the removal of the dusts from combustion exhaust gases, particularly those of heavy oils, by using a fixed packed bed without a remarkable increase in the pressure loss at the fixed packed bed, which is characterized in that the filler filled in the fixed packed bed is a spherical, cylindrical or annular filler containing pores having a pore diameter which ranges from 100 to 70,000 A and a pore volume of not less than 0.1 cm$^3$/g, at least 20% of the pores have a pore diameter of not less than 1,000 A, and the filler having a diameter of 1 to 15mm at a minimum.

4 Claims, No Drawings

METHOD FOR THE REMOVAL OF THE DUSTS FROM COMBUSTION EXHAUST GASES

The present invention relates to a method for the removal of dust from the combustion exhaust gases. More particularly, it relates to a method for the removal of dusts from the combustion exhaust gases of heavy oils by using a fixed packed bed filled with a specific filler.

It is well known that the combustion exhaust gases, particularly that of heavy oils, contain several tens to several hundreds mg/Nm³ of the dusts comprising predominantly carbons.

Recently, there have been known various processes for the selective removal of sulfur oxides or nitrogen oxides from combustion exhaust gases, wherein it is occasionally required to initially remove the dusts contained in the gases. The removal of the dusts is usually carried out, for instance, by washing the gases with water.

Besides, it has been proposed to remove the nitrogen oxides by contacting the gases with a metal oxide at 150° to 800° C in the presence of ammonia. In this method, when the dusts are removed by washing with water, the gases must be heated before the selective removal of the nitrogen oxides by contacting with the metal oxide, which is uneconomical. For removing the dusts without lowering the temperature of the gases, there may be also used a dust-removing device, such as a cyclone, a Cottrell precipitator, or the like. However, according to such a dust-removing device, the dusts are not sufficiently removed, but also it requires a high cost for the device.

It has also been known that the dusts accompanied with gases may be removed by a mechanical means, such as a filtration with a packed bed filled with a filler having a comparatively small particle size, such as sands, glass beads, alumina particles, or the like. However, according to this method, the pressure loss is comparatively large, and furthermore, the dusts contained in the gases are collected and accumulated in the packed bed, which causes a considerable increase of the pressure loss at the fixed packed bed. Accordingly, it has been considered that the removal of the dusts with a fixed packed bed is not suitable, when a large volume of gases, such as the combustion exhaust gases, should be treated.

According to the present inventors' studies, it has surprisingly been found that the removal of dusts from the combustion exhaust gases can be effectively done by using a fixed packed bed without the problem of pressure loss, when a specific filler is used.

An object of the present invention is to provide a method for the removal of the dusts from a large volume of gases, such as the combustion exhaust gases, with a minor pressure loss.

Another object of the invention is to provide a method for the removal of the dusts from the combustion exhaust gases by using a fixed packed bed filled with a specific filler.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, the removal of the dusts is carried out by using a fixed packed bed filled with a spherical, cylindrical or annular filler comprising predominantly a member selected from the group consisting of aluminum oxide ($Al_2O_3$), silicon oxide ($SiO_2$), titanium oxide ($TiO_2$), zirconium oxide ($ZrO_2$), ferric oxide ($Fe_2O_3$), calcium oxide ($CaO$), magnesium oxide ($MgO$), sodium oxide ($Na_2O$), potassium oxide ($K_2O$), or a combination of two or more thereof, preferably aluminum oxide, silicon oxide, titanium oxide, or a combination thereof, which contains pores having a pore diameter which ranges from 100 to 70,000A and a pore volume of not less than 0.1 cm³/g, preferably at least 20% of the pores have a diameter of not less than 1,000A, and the filler has a diameter of from 1 mm to 15 mm at minimum. The filler may be in a spherical, cylindrical or annular shape.

It has usually been considered that the filler used for the removal of the dusts should have a smaller diameter in comparison with the diameter of the dusts. On the contrary, the present invention is characterized in that larger fillers are used, for instance, when the diameter of the dusts is 0.1 to 100 μ, the spherical filler has a diameter of from 2 to 10 mm. The reason is that the removal of the dusts in the present invention is effected by absorbing and trapping the dusts in the pores of the filler, but not by screening the dusts with fillers having a smaller pore as in the conventional methods. That is, when the fillers contain the pores having a pore diameter which ranges from 100 to 70,000A and a pore volume of not less than 0.1 cm³/g, preferably at least 20% of the pores have a pore diameter of not less than 1,000A, even if the fillers are far larger than the dusts, the dusts are largely collected in the fixed packed bed (the uncollected dusts are so slight) and further the pressure loss is significantly small.

The fillers used in the present invention should contain pores preferably at least 20% of the pores having a pore diameter of not less than 1,000A, because the fillers containing such large pores can effectively adsorb and trap the dusts of the combustion exhaust gases, which comprise predominantly carbons having a particle size of about 1,000 A at minimum. Accordingly, it is more preferable to use the fillers containing pores preferably at least 15% of the pores having a pore diameter of not less than 10,000 A. When the fillers do not contain those pores having a pore diameter of not less than 1,000 A, the porosity of the fillers is decreased by the dusts adsorbed on the surface of the fillers, which results in the remarkable increase of the pressure loss and therefore the process can not be continuously operated for a long period of time.

Moreover, the fillers used in the present invention should have a pore volume of not less than 0.1 cm³/g, the pore diameters of which range from 100 to 70,000 A. As mentioned above, since the dusts are adsorbed and trapped mainly in the pores of the fillers, when the pore volume of the fillers is larger, the dusts are more largely adsorbed and trapped, and it is more preferable that the pore diameters of the fillers range from 1,000 to 70,000 A. When the pore volume of the fillers having the pore diameters ranging from 100 to 70,000 A, which correspond to the particle sizes of the dusts, is less than 0.1 cm³/g, the absolute amount of the dusts adsorbed and trapped in the pores becomes smaller, and as the result, it is difficult to operate continuously the process with a minimum pressure loss.

According to the method of the present invention, the combustion exhaust gases, such as the gases from a boiler, can be directly introduced into the fixed packed bed, and therefore, it is very convenient to apply to the catalytically reductive removal of the nitrogen oxides with ammonia. In a suitable embodiment of the present invention, the combustion exhaust gases are firstly subjected to the partial removal of the dusts with a multicyclone, and then, introduced into the fixed packed bed filled with the specific filler of the present invention. In such a case, the process can be continuously operated for a longer time. In another preferred embodiment of the present invention, two series of the fixed packed beds are provided in parallel and are alternately operated, that is, when one of them is being utilized, the fillers of the other one are regenerated or exchanged with fresh fillers.

The method of the present invention is particularly useful for the removal of the dusts from the combustion exhaust gases of heavy oils, and after removing the dusts, the combustion exhaust gases can be subjected to the catalytically reductive removal of the nitrogen oxides without heating or cooling.

The present invention is illustrated by the following Examples but is not limited thereto.

EXAMPLE 1

In a process for the selective removal of nitrogen oxides from an exhaust gas of a boiler wherein a C-heavy oil is burnt by catalytically reducing with ammonia, a fixed packed bed type dust-removing device is provided at the upper end of the catalyst bed for the selective removal of nitrogen oxides. The used fillers are spherical ones (diameter: 4 — 6 mm) comprising predominantly aluminum oxide ($Al_2O_3$) and contains a large amount (about 60 % on the basis of the whole pores contained in the fillers) of pores having a pore diameter of not less than 1,000 A and a comparatively large amount (about 15 %) of pores having a pore diameter of 10,000 A, and further, the pore volume of the pores ranging from 100 to 70,000 A in the pore diameter is 0.38 $cm^3/g$. The filling amount of the fillers in the fixed packed bed is 4,660 liters.

The exhaust gas has a temperature of about 300 to 350° C and is conveyed at a rate of 20,000 $Nm^3$/hour. The concentration of the dusts is 45 – 50 mg/$Nm^3$ at the inlet of the fixed packed bed and 7 – 11 mg/$Nm^3$ at the outlet of the fixed packed bed. The concentration of the dusts is measured by the method described in JIS (Japanese Industrial Standard) Z-8808, type I (a cylindrical filter paper made from silica is used).

When the device is continuously operated for about 4,000 hours, the pressure loss at the fixed packed bed is increased merely to 31 mmAq (initial: 23 mmAq).

EXAMPLE 2

The same combustion exhaust gas from a boiler as in Example 1 is treated with the two fixed packed beds which are provided in parallel. The gas flow amount, the temperature of the gas, the concentration of the dusts at the inlet of the fixed packed bed and the filling amount of the filler per one bed are the same as in Example 1. The used fillers are a spherical one (diameter: 3 – 5 mm) comprising predominantly α-alumina and contains about 20 % of the pores having a pore diameter of not less than 1,000 A, and the pore volume of the pores ranging from 100 to 70,000 A in the pore diameter is 0.40 $cm^3/g$. The concentration of the dusts at the outlet of the fixed packed bed is 6 – 10 mg/$Nm^3$.

When the device is continuously operated for about 4,500 hours, the pressure loss at the fixed packed bed is increased from 25 mmAq to 34 mmAq, and then, the gas flow is changed to another packed bed provided in parallel with a damper. After changing the gas flow, the device is continuously operated for about 3,000 hours, and then the pressure loss at the fixed packed bed is increased from 23 mmAq to 28 mmAq. The concentration of the dusts at the outlet of the fixed packed bed is so small as 7 – 11 mg/$Nm^3$.

What is claimed is:

1. A method for the removal of the dusts from combustion exhaust gases by a fixed packed bed, which comprises passing a dust-containing combustion exhaust gas through a fixed packed bed filled with a spherical, cylindrical or annular filler material containing pores having a pore diameter which ranges from 100–70,000A and a pore volume of not less than 0.1 $cm^3/g$ at least 20% of said pores having a diameter of not less than 1,000A, said filler material making up said bed having a minimum of 1 to 15mm.

2. The method according to claim 1, wherein the filler material comprises a member selected from the group consisting of aluminum oxide, silicon oxide, titanium oxide, zirconium oxide, ferric oxide, calcium oxide, magnesium oxide, sodium oxide, potassium oxide, and a combination of two or more thereof.

3. The method according to claim 1, wherein the filler material contains pores about 15% having a pore diameter of not less than 10,000 A.

4. The method according to claim 1 wherein the pores have a pore diameter which ranges from 1,000 to 70,000 A.

* * * * *